(12) United States Patent
Chien

(10) Patent No.: US 7,154,997 B1
(45) Date of Patent: Dec. 26, 2006

(54) SUBSCRIPTION-BASED BILLING METHODS AND SYSTEMS FOR SHARED NETWORK MODEM POOLS

(75) Inventor: Herman Chien, Redmond, WA (US)

(73) Assignee: Cingular Wireless II, LLC, Atlanta, GA (US)

(*) Notice: Subject to any disclaimer, the term of this patent is extended or adjusted under 35 U.S.C. 154(b) by 92 days.

(21) Appl. No.: 09/665,780

(22) Filed: Sep. 20, 2000

Related U.S. Application Data

(60) Provisional application No. 60/173,416, filed on Dec. 28, 1999.

(51) Int. Cl.
H04M 15/00 (2006.01)

(52) U.S. Cl. .................. 379/115.01; 379/114.01; 379/120; 379/127.01

(58) Field of Classification Search ............ 379/111, 379/112.01, 114.01, 115.01, 116, 119, 120, 379/126, 127.01, 133–134, 135
See application file for complete search history.

(56) References Cited

U.S. PATENT DOCUMENTS

| | | | |
|---|---|---|---|
| 5,003,584 A | | 3/1991 | Benyacar et al. |
| 5,187,710 A | | 2/1993 | Chau et al. |
| 5,351,286 A | | 9/1994 | Nici |
| 5,721,780 A | * | 2/1998 | Ensor et al. ............. 713/155 |
| 5,745,556 A | * | 4/1998 | Ronen |
| 5,745,884 A | | 4/1998 | Carnegie et al. |
| 5,864,610 A | | 1/1999 | Ronen |
| 5,995,606 A | * | 11/1999 | Civanlar et al. ........ 379/207.13 |
| 6,253,327 B1 | * | 6/2001 | Zhang et al. ................. 726/14 |
| 6,304,566 B1 | * | 10/2001 | Schessel ..................... 370/354 |
| 6,351,453 B1 | * | 2/2002 | Nolting et al. |
| 6,496,824 B1 | * | 12/2002 | Wilf ............................ 707/10 |
| 6,553,022 B1 | * | 4/2003 | Hartmaier |
| 6,618,370 B1 | * | 9/2003 | Malik ......................... 370/352 |

FOREIGN PATENT DOCUMENTS

| | | |
|---|---|---|
| EP | 1 039 688 A2 | 9/2000 |
| WO | WO 98/20646 | 5/1998 |
| WO | WO 99/62036 | 12/1999 |
| WO | WO 00/14919 | 3/2000 |

OTHER PUBLICATIONS

"Ricochet" Product & Service by Metricom, Inc., Selected Web Pages from www.metricom.com, pp. 6 of 7 and 7 of 7.

* cited by examiner

*Primary Examiner*—Quoc Tran
(74) *Attorney, Agent, or Firm*—Woodcock Washburn LLP

(57) ABSTRACT

Methods of billing telephone calls in networks that utilize shared modem pools. A request from a user of the network is received along with user identifying data. The user identifying data is correlated with records in a database of user identifying data and if a match is found, the call is passed through the network. The user has then been authenticated as a valid user of the network and can be billed accordingly, even though a random modem in the modem pool was used to place the call. This allows the user to be billed for the call so that the owner of the modem pool is not left financially responsible for the long-distance and/or other toll charges incurred by the user in making the call. The methods also ensure that the modem pool owners can bill for all calls, thereby enhancing the network's revenue stream.

18 Claims, 2 Drawing Sheets

SUBSCRIPTION-BASED BILLING METHODS AND SYSTEMS FOR SHARED NETWORK MODEM POOLS

RELATED APPLICATIONS

This application claims priority under 35 U.S.C. § 119 from provisional U.S. Patent Application Ser. No. 60/173,416 filed Dec. 28, 1999.

BACKGROUND OF THE INVENTION

1. Field of the Invention

This invention relates generally to methods and systems for utilizing modem pools through a network. More specifically, the invention relates to methods and systems for billing when a call is made on a particular modem that is a member of a modem pool.

2. Description of the Related Art

Most office environments utilize computer networks for various tasks, which require "dial-out" capabilities to, e.g., the Internet and to other types of networks, like wide area networks (WANs), local area networks (LANs), Intranets and others. A modem is typically used to make the telecommunications link between the user of the network and another network or user to whom the current user desires to link. As the Internet has grown, and as the number of users of office computer networks proliferates, managing the outgoing calls over office computer networks becomes an increasingly difficult task.

Typical office computer networks employ a shared "modem pool" which is essentially a bank of modems. In such an arrangement, no single computer in the network is assigned a single modem with which to make dial-out connections, but rather any computer in the network may dial-out with any free modem in the pool depending on a particular queuing algorithm which routes connections from computers in the network to the next available modem. While some modems may be "smart" modems in that they have the ability to communicate with the individual computer requesting the dial-out connection and to track the calls so made, most networks do not employ to any large degree such smart modems since they are expensive. Thus, when it is desired to track a call made by a computer in the network for purposes such as billing the call, the network is simply unable to do so with the network-based modem pool. In point of fact, most computer networks are setup today so that only a single account, typically that belonging to the modem pool owner, gets billed for all of the calls made from the shared modem pool.

This is mainly a consequence of the limitations of current local exchange carriers (LEC) and the existing telephony networks. Various local and long distance providers today engage in an elaborate signaling and billing system whereby local tariff and long distance calls are switched among multiple carriers in order to complete the call. These entities then separate the total cost of the call among each other and distribute the money for each call according to a model based on how many resources have been used by each carrier in completing the call. The bills for each call are sent to the responsible caller's service provider for inclusion on the caller's monthly bill. When a modem pool is involved, this results in the modem pool's owner being held financially responsible for this bill.

This type of billing arrangement with a shared modem pool is problematic for most computer networks especially since the owner of the network-based modem pool is, in reality, not responsible for the end users' calls. This arrangement is best illustrated in a Fixed Wireless System where end users access network-based modem pools over wireless data channels. In this case, it is very difficult to track and bill each of the end users for their access to the modem pool. Moreover, a way to track incurred long-distance and other toll charges made by a modem pool does not exist today. It will be appreciated that this creates a significant economic impact on the Fixed Wireless System owner since it cannot bill the users for such access to the network. Even smart modems, which contain user authentication features therein, are not adequate for sophisticated and complete billing procedures in networks using modem pools. Such smart modems typically provide an accounting of calling events and do not further process calling event information. Thus, smart modems in a modem pool cannot provide true billing services.

There thus exists a long-felt need for methods and systems for allowing end users of a computer network to be billed directly for their use of a network-based or shared modem pool. It is desirable that such systems and methods be economical to implement and versatile for use with a variety of computer networks. Moreover, the systems and methods should be easily retrofitable with existing networks, and easily integratable with new networks. Such systems and methods should also not interfere with the speed of the modems in the shared pool, or with the operations of the computers and processors accessing the network. Additionally, the systems and methods should allow for simple billing of the dial-out connections from individual computers or users in a straightforward billing format. These needs have not heretofore been achieved in the art.

SUMMARY OF THE INVENTION

The aforementioned problems are solved, and long-felt needs met, by methods of billing a telephone call in a network that utilizes a modem pool. Preferably, a request is received from a user of the network to place a telephone call through the modem pool. Along with the request, user identifying information is received to authenticate the request as coming from a valid user of the network. It is then preferred to correlate the user identifying information with billing information associated with the user, and to bill the user for the telephone call if the user identifying information has been correlated with the billing information.

In a further preferred aspect of the invention, methods of processing a request to place a telephone call through a network that utilizes a modem pool are provided. In a preferred embodiment, user identifying information associated with a user that has placed a telephone call through the network is received, and a database is searched that contains information related to users of the network to correlate the user identifying information with the user and to authenticate the user as a valid user of the network. It is then preferable to pass the telephone call through the network if the user identifying information has been correlated to the user and the user has been authenticated as a valid user of the network. The responsible caller's telephone number is then passed to a local exchange carrier by a communications protocol and the long-distance or other telephone charges generated by the call are sent back by the local exchange carrier for aggregation and ultimate billing to the user making the call so that the owner of the modem pool is not left responsible for the toll and/or other long-distance charges.

Thus, the inventive methods provide an efficient and accurate way in which to bill for telephone calls in a network that utilizes a shared modem pool. Without such methods, these telephone calls will go unbilled, thereby greatly reducing the revenue flow for telephone calls to the owners and/or operators of the network. Moreover, the inventive methods are easily integratable into current networks that are controlled and operated by computer, as they may be easily implementable in software. These results have not heretofore been achieved in the art.

These and other features and benefits of the invention will be recognized by those with skill in the art by reading the following detailed description of the invention in conjunction with the drawings that are first described briefly below. However, the invention is not limited by this description and the drawings, but only by the claims that are appended hereto.

BRIEF DESCRIPTION OF THE DRAWINGS

In the drawings wherein like reference numerals refer to like elements throughout the several views thereof.

DETAILED DESCRIPTION OF THE PREFERRED EMBODIMENTS

Figure 1:
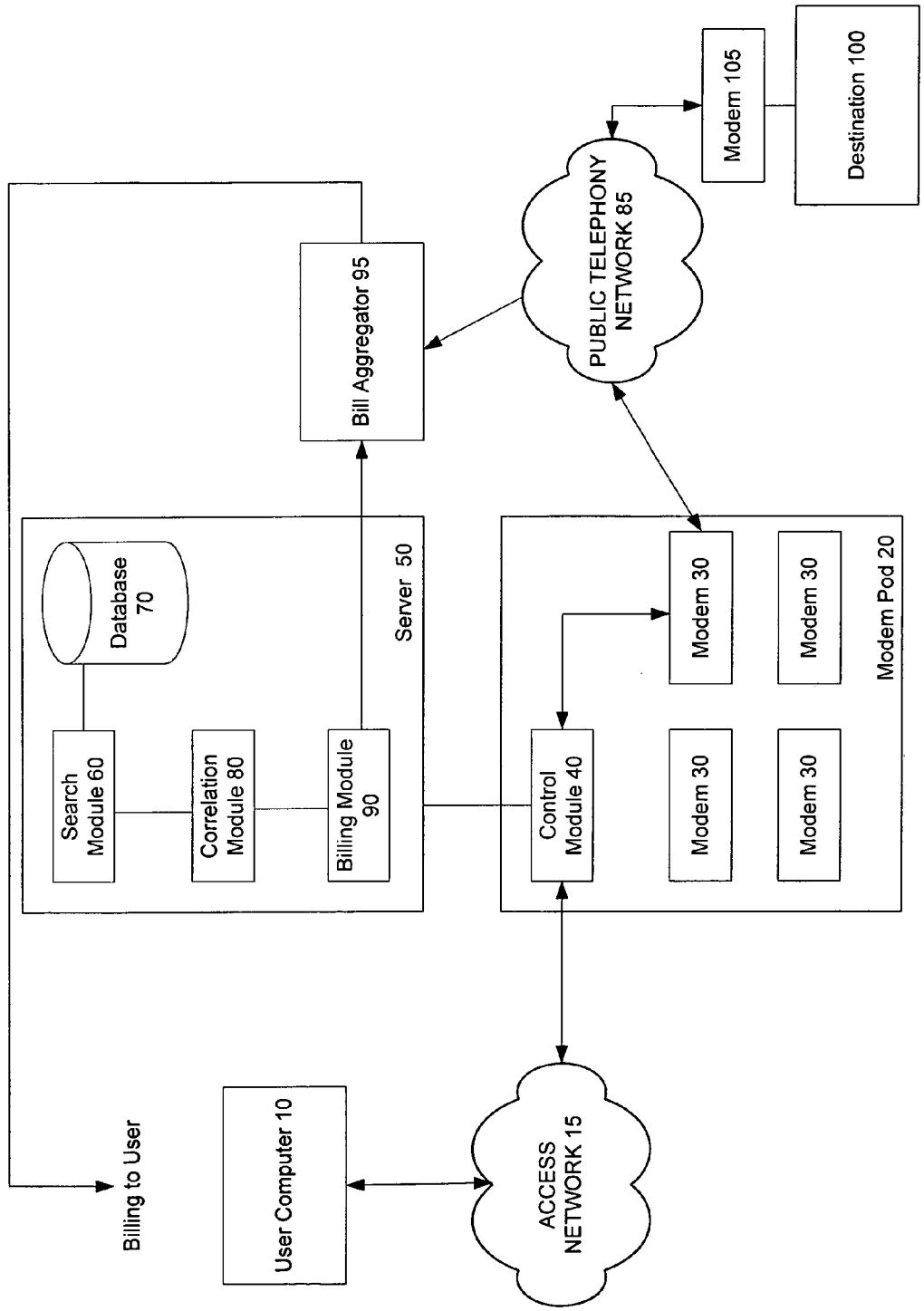
FIG. 1 is a block diagram of a network that utilizes the inventive methods of billing through a shared modem pool.

Referring now to FIG. 1, a system that utilizes a shared modem pool is depicted wherein the inventive methods of billing for telephone calls are implemented. A user 10 of the system attempts to place a telephone call through the system through an access network 15 that provides users with a connection to the outside world. The access network 15 is any network that is operable to provide service to the user, for example, a fixed wireless network, a LAN or WAN, an Intranet, or the Internet. The user 10 may be situated in an office or home environment to which modem pool 20 is provided. The user 10 may utilize a personal or laptop computer, a landline telephone, a wireless or cellular telephone, a personal digital assistant, a facsimile machine, a set-top box, or any other device that communicates through the network 15. Any device that is operable to place telephone calls may be used to place the call.

Typically, the user is interfaced through network 15 to the shared modem pool 20 which comprises a plurality of modems 30 that allow multiple users to make telephone calls simultaneously through network 15, and a control module 40 which preferably provides functionality to control and process calls. The modem pool 20 is further operable to pass telephone calls to the outside world, to other users, or to any other person or device which user 10 desires to contact. Generally, the user 10 will place a telephone call that is first received by control module 40 which picks an open modem 30 currently not in use through which the call will be passed. While the inventive methods are particularly useful for establishing billing for a modem pool with more than one modem, it will be appreciated that these methods are equally applicable for performing billing when only one modem is available to the network, but more than one user has access to the single modem. The term "modem pool" should be construed throughout to include this single modem arrangement.

The access network 15 and shared modem pool 20 are provided by the service provider and are connected to a public telephony network 85 which, in the past, has traced the telephone calls made by users 10 for billing purposes only as far back as modem pool 20. Acting as a typical "local exchange carrier" (LEC), the public telephony network 85 accumulates long-distance and local charges, which, absent the implementation of the inventive methods, become the responsibility of the service provider to pay. The present invention removes this set of problems for the service provider by signaling to the LEC that the party responsible for the costs associated with the users' telephone calls are the users themselves, not the service provider.

This has not been possible in the past since the user 10 is only known to modem pool 20 by identifying attributes, e.g., an IP address, a username, or the destination phone number. This is not enough information to bill the user 10 specifically for the telephone call, but will usually allow the user to be authenticated as a valid user of the network. Authentication involves verifying the above-referred to attributes with an authentication database that preferably checks these attributes against subscribed to attributes for the user 10 that are stored in the authentication database, as well as attributes that are associated with the called number. For example, a particular user may be allowed to make local calls only and would therefore be denied access to the public telephony network 85 if a long-distance call is attempted. This is an example of an attribute that could be authenticated with the inventive methods.

The inventive methods are implemented by a server 50 which is essentially a computer that performs all of the maintenance, operational and other functions associated with the access network 15 and the services made operable thereby. In a preferred embodiment, the access network 15 is a Fixed Wireless Network. Moreover, server 50 may be a commercially available server which runs a UNIX environment, WINDOWS environment or any other appropriate operating system. For example, the Compaq Computer Corp. (Houston, Tex.) PROLIANT server is an appropriate server, or servers available from Sun Microsystems may also be utilized.

In accordance with the invention, server 50 is provided with a software platform to perform the billing processes and associated functions of the invention to be described below. The software may be programmed in any language such as C++, JAVA, VISUALBASIC, HTML, or others. It will be recognized that the software may also be programmed in modules with specific functionality that will be controlled by server 50. Moreover, the software may be hard-coded or burned into a microchip, stored on a harddrive associated with server 50, or placed in a separate memory that is remote from server 50 but which can be accessed therefrom. All such embodiments and equivalents thereof are within the scope of the present invention.

In accordance with the invention, a higher level of intelligence is placed in the authentication data base and modem pool than has previously existed. The high-level intelligence allows the inventive methods to provide not only a "go, no-go" decision to allow the call to be passed as result of authentication, but to provide the user's billing number and other relevant information to the public telephony network 85 for billing to the user directly without involving the service provider in billing the user.

Preferably, the modem pool 20 utilizes a communications protocol to forward the billing and other important information to the public telephony network or LEC 85. For example, the Primary Rate Interface (PRI) protocol currently in use today may be employed to forward the billing information to the LEC. Any protocol that is rich in information fields can be used to forward the billing information to the LEC.

Today the role of PRI is to link the modem to the LEC. The present invention expands the use of PRI and allows PRI to pass the responsible caller's telephone number during the call to the telephony network such that all the normal billing and rating processes normally occur and so that the charges for toll and other calls get sent to the responsible caller's service provider for inclusion on the caller's bill.

A request to make a telephone call is input to the system along with user identifying data that accompanies the request and that identifies the particular user that is making the request and the telephone call. After the request to pass a telephone call is received by server 50, a search module 60 initiates a search of the authentication database 70 that preferably contains authenticating data concerning all of the users that may make telephone calls. Depending on the level of sophistication of the device that is employed by the user to make the telephone call, the originating phone number may or may not be apparent to the modem pool. For example, a Plain Old Telephone System (POTS) handset will not convey any information to the modem pool about the origination phone number, but a computer could convey this and more. Therefore, the data base search and look-up task may vary in sophistication which will be generally inversely proportional to the sophistication of the user's device. The invention is intended to cover all such levels of sophistication in both the user's device and the data base search and look-up schemes. The user identifying information may comprise any relevant data about the user that is necessary to allow the user to be billed for the telephone calls. For example, the user's home and/or business address, name, IP address, social security number, network account number, computer or other device serial number, and other important information may be stored in database 70 to allow the search module 60 to accurately, quickly and efficiently look-up and authenticate the users therein. The user identifying information may be added, deleted, or changed when necessary.

Once the search module 60 has accessed the authentication database 70, a correlation module 80 compares the user identifying information that is received with the entries in the database 70 to determine whether the user requesting to make the telephone call is authorized to do so, and whether that user can indeed be billed for such a call. Once it is determined by correlation module 80 that the user is authorized and can be billed, the call may be passed to its appropriate destination. A billing module 90 then prepares billing information for the telephone call. Billing may be accomplished in a conventional manner with known software. A billing aggregator module 95 then aggregates the billing information for all calls made through the modem pool by collecting authenticated information about the user from the billing module 90 and receiving toll and/or other long-distance charge information from the LEC so that these charges can be billed to the user.

The billing aggregator 95 thus preferably accepts data from two paths. The first path is from the public telephony network 85 to the billing aggregator 95 wherein the user's 10 telephone number and billing charges for the call made by user 10 can be collected. A second path involves receipt by the billing aggregator 95 of authenticated user identifying information which allows the modem pool owners to charge for individual accesses to the network by the users or for other revenue generating events that the network can track using the per-call authentication scheme described above. These two paths allow for complete billing of all charges to the user and removes financial responsibility from the modem pool owners for these charges.

Figure 2:
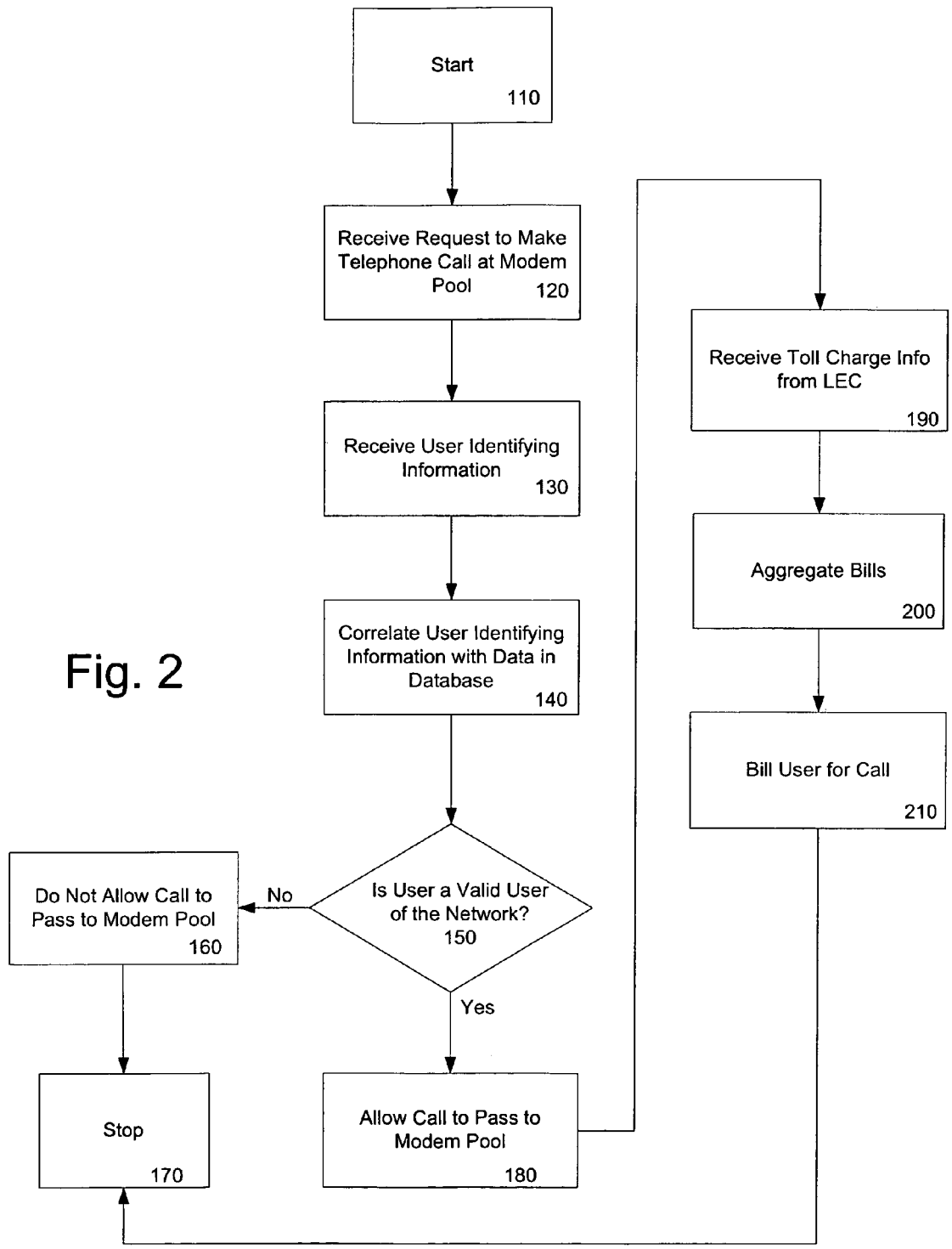
FIG. 2 depicts a flow chart of a preferred embodiment of the inventive methods.

As mentioned above, the inventive methods may be programmed in software and implemented on a computer. Referring to FIG. 2, a flow chart is depicted of a preferred method that may be programmed in software for billing a user for a telephone call made through a network utilizing a shared modem pool. The method starts at step 100 and at step 110 a request is received to make a telephone call at the modem pool of the network. At step 120, the user identifying information is also received, and at step 130 the authentication database of allowed users is accessed. The database contains records of user identifying data for all allowed users of the network.

At step 140 the user identifying data is then correlated with the data in the authentication database. Correlation involves at step 150 determining whether the user is a valid user of the network. If not, then at step 160 the user is not permitted to make the telephone call (or alternatively the call is allowed but the user is not billed for the call) and the method stops at step 170. If so, then at step 180 the call is permitted to pass the modem pool. At step 190, long-distance and/or other toll charges for the telephone are received from the LEC, and this information as well as authenticated user identifying information which may carry additional charges is aggregated at step 200. At step 210, the billing for the telephone call is then made to each of the users making telephone calls through the modem pool so that the service provider, i.e., the owner of the modem pool, is not left financially responsible for the calls made by the users.

Thus, the inventive methods provide an efficient and accurate way in which to bill for telephone calls in a network that utilizes a shared modem pool. Without such methods, these telephone calls will go unbilled or would be billed to the service providers. Moreover, the inventive methods are easily integratable into current networks that are controlled and operated by a computer, as they may be easily implementable in software. These results have not heretofore been achieved in the art.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

What is claimed is:

1. A method of billing a telephone call made through a shared local access network that shares at least one modem in a shared modem pool among multiple users, the method comprising:

receiving a request from one of the users of the shared local network to place an outbound telephone call through the shared modem pool to a public telephony network, wherein the request includes a telephone number of the user, and wherein the shared local access network and shared modem pool together provide shared access to the public telephony network and are located to receive the outbound telephone call before it accesses the public telephony network;

before the telephone call is placed through the shared modem, authenticating the request as coming from a valid user of the shared local access network based at least in part on user identifying information for the user, and without requesting and requiring user input before each telephone call, wherein the authenticating is not performed at a destination associated with the telephone call, and wherein the telephone call placed through the shared modem pool to the public telephony network includes the user's telephone number in addition to any telephone number associated with the shared modem pool;

correlating the user identifying information with billing information associated with the user, including the user's telephone number; and forwarding call charge information from the public telephony network so that the user is billed for the call, while other users of the shared modem pool are separately billed for telephone calls they place.

2. The method recited in claim 1, wherein the correlating step comprises the step of searching a database comprising records of user identifying data for all valid users of the shared local access network.

3. The method recited in claim 2, wherein the searching step comprises the step of comparing the user identifying information to the billing information associated with the user, and authenticating the user when the user's user identifying data matches the billing information.

4. The method recited in claim 3, further comprising the step of passing the telephone call through the network after the user identifying information is authenticated.

5. The method recited in claim 4 wherein the shared local access network comprises a fixed wireless network.

6. A method of processing a request through a shared local network to place a telephone call via a modem, comprising:

receiving user identifying information associated with a user that has made the request through the shared local network to place the telephone call via a modem pool, and wherein the receiving user identifying information is performed without requesting or requiring user input before each telephone call, wherein the user shares the modem pool and the local network with multiple other users, wherein the modem pool shared with the other users provides access to a public telephony network, and wherein the user and at least some of the multiple other users have unique telephone numbers, and wherein the shared local network and modem pool are positioned before the telephone call accesses the public telephony network:

before placing the telephone call via the modem pool shared with the other users, searching a database containing information related to users of the shared local network to correlate the user identifying information with the user and to authenticate the user as a valid user of the shared local network, wherein the database is coupled to receive data from the shared modem pool;

if the user is authenticated as a valid user of the shared local network, forwarding call charge information from the public telephony network so that the user is billed for the call; and placing the telephone call via the shared modem pool, wherein placing the call includes forwarding the unique telephone number of the user to the public telephony network, with any telephone number associated with the modem pool, to permit the public telephony network to provide appropriate billing information for the user who placed the telephone call.

7. The method recited in claim 6, wherein the searching further comprises comparing the user identifying information with records of billing information stored in the database.

8. The method recited in claim 7, further comprising billing the user for the telephone call when the user has been authenticated as a valid user of the shared local network.

9. The method recited in claim 8, wherein the shared local network comprises a wireless network.

10. A computer system that utilizes a modem for processing calls received from an access network and made to a public telephony network, the computer system comprising:

a server able to receive user identifying information associated with a user of the access network that has requested to place a telephone call to the public telephony network via a shared modem pool and able to, after the user has been authenticated as a valid user, place the telephone call via the shared modem pool and without requesting user input before each telephone call, wherein the server is able to obtain a phone number associated with the user via the telephone call, and to provide the user's telephone number to the public telephony network in addition to any telephone number associated with the shared modem pool, and wherein the user shares with other users access to the public telephony network via the access network and shared modem pool that both precede access to the public telephony network;

a search module able to search a database containing information related to users of the access network in order to correlate the user identifying information with the user and authenticate the user as a valid user and able to notify the server of authentication of the user, wherein the search module, database, or both are at an intermediate location with respect to the access network and the public telephony network, and not at a source or destination associated with the telephone call, and wherein the search module is configured to provide the user's telephone number if the user's telephone number is not provided via the telephone call; and a billing aggregator module able to aggregate charge call information received from the public telephony network and the user identifying information so that the user is billed for the call.

11. The computer system recited in claim 10, further comprising a correlating module for comparing the user identifying information with records of user billing information stored in the database.

12. The computer system recited in claim 11, further comprising a billing module in communication with the correlating module for billing the user for the telephone call when the user has been authenticated as a valid user.

13. The computer system recited in claim 12, wherein the access network comprises a fixed wireless network.

14. The computer system recited in claim 10, further comprising a shared modem pool with multiple modems that is accessible over the access network to each of multiple users of the access network.

15. A computer-readable medium whose contents cause a computing device to handle a telephone call made via a modem through a network, by performing a method comprising:

receiving a request from a user of the network to place a telephone call via a shared modem pool having multiple modems, wherein the request includes a telephone number associated with the user, and wherein the user shares access to a public telephony network via the network and shared modem pool that both precede access to the public telephony network:

receiving user identifying information to authenticate the request as coming from a valid user of the network, and wherein the receiving user identifying information is performed without requiring user input before each telephone call, and wherein the authenticating is substantially performed not at a destination associated with the telephone call;

if the user identifying information received is authenticated, correlating the user identifying information with billing information associated with the user;

placing the telephone call via one of the modems of the shared modem pool and providing the user's telephone number in addition to any telephone number associated with the shared modem pool; and billing the user for the call based at least in part on the billing information associated with the user and on call charge information for the placed telephone call that is received from the public telephony network based on the user's telephone number.

16. The computer-readable medium of claim 15 wherein the modems of the shared modem pool are connected to the public telephony network, and wherein the placing of the telephone call via the modem includes supplying the billing information associated with the user to the public telephony network.

17. The computer-readable medium of claim 15 wherein the network comprises a wireless network.

18. The computer-readable medium of claim 15 wherein the method is performed for each of multiple users of the network.

* * * * *